US010977559B2

(12) United States Patent
Zanpure

(10) Patent No.: US 10,977,559 B2
(45) Date of Patent: Apr. 13, 2021

(54) METHOD AND SYSTEM FOR PREDICTING NON-LINEAR RELATIONSHIPS

(71) Applicant: WIPRO LIMITED, Bangalore (IN)

(72) Inventor: Chaitanya Rajendra Zanpure, Pune (IN)

(73) Assignee: Wipro Limited, Bangalore (IN)

(*) Notice: Subject to any disclaimer, the term of this patent is extended or adjusted under 35 U.S.C. 154(b) by 749 days.

(21) Appl. No.: 15/470,249

(22) Filed: Mar. 27, 2017

(65) Prior Publication Data
US 2018/0268282 A1 Sep. 20, 2018

(30) Foreign Application Priority Data
Mar. 17, 2017 (IN) .............................. 201741009434

(51) Int. Cl.
*G06N 3/10* (2006.01)
*G06N 3/08* (2006.01)
(52) U.S. Cl.
CPC ............... *G06N 3/10* (2013.01); *G06N 3/082* (2013.01); *G06N 3/084* (2013.01)
(58) Field of Classification Search
CPC ........... G06N 3/10; G06N 3/082; G06N 3/084
See application file for complete search history.

(56) References Cited

U.S. PATENT DOCUMENTS

| 7,788,196 B2 | 8/2010 | Buscema | |
|---|---|---|---|
| 10,360,517 B2* | 7/2019 | Koch | .................... G06N 20/10 |
| 2007/0077665 A1* | 4/2007 | Bump | ................... G06F 3/0484 |
| | | | 438/14 |

FOREIGN PATENT DOCUMENTS

WO  WO 2016/145516  9/2016

OTHER PUBLICATIONS

Arno Candel "Deep Learning with H2O" pp. 1-55 (Year: 2016).*
Amar Budhirahja, "Dropout in Deep Machine learning", pp. 1-5, 2016 (Year: 2016).*
Roy, "Feature Selection using Deep Neural Networks", IEEE, 2015 (Year: 2015).*
Teglor, "Deep Learning Libraries by Language", 2017, *Home Insurance Analytics*, 1-3 pages.
"Deep Learning Frameworks", 2017, *NVIDIA Developer*, 1-3 pages.

* cited by examiner

*Primary Examiner* — Ann J Lo
*Assistant Examiner* — Van C Mang
(74) *Attorney, Agent, or Firm* — Finnegan, Henderson, Farabow, Garrett & Dunner, LLP

(57) ABSTRACT

A method and a system are provided for predicting a non-linear relationship between a plurality of parameters in a deep neural network framework. The method comprises receiving, by an application server, a plurality of parameter values associated with the plurality of parameters. The method further comprises selecting, by the application server, an activation function based on a desired output. In an embodiment, the desired output is based on an industry type and an application area of the plurality of parameters. The method further comprises predicting, by the application server, the non-linear relationship between the plurality of parameters by modelling the deep neural network framework based on the selected activation function.

15 Claims, 5 Drawing Sheets

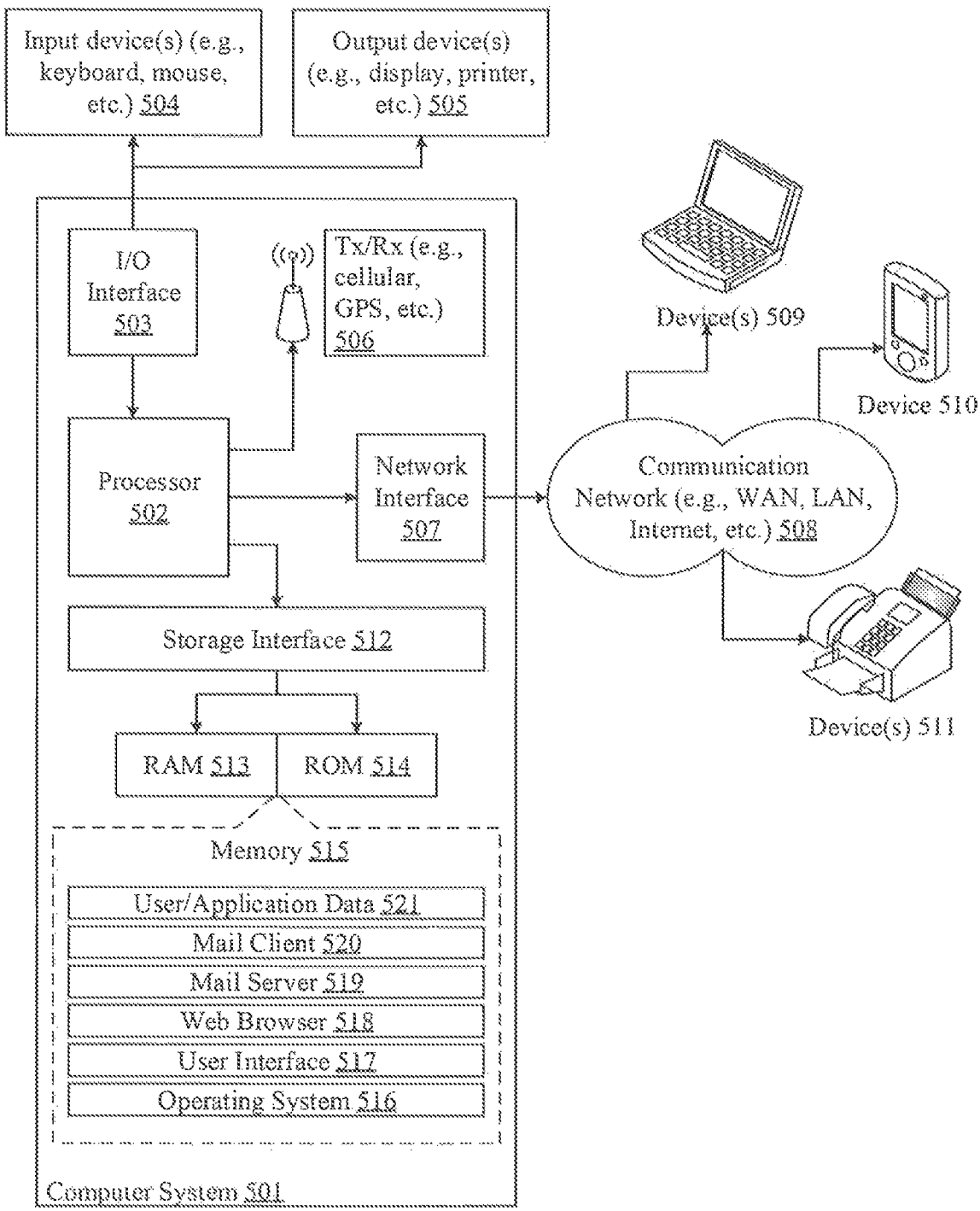
FIG. 5 Example Computer System

METHOD AND SYSTEM FOR PREDICTING NON-LINEAR RELATIONSHIPS

TECHNICAL FIELD

The presently disclosed embodiments are related, in general, to neural networks. More particularly, the presently disclosed embodiments are related to method and system for predicting a non-linear relationship between each of a plurality of parameters in a deep neural network framework.

BACKGROUND

Machine learning is a field of computer science with strong ties to mathematics and statistics. Neural networks are a programming paradigm that enables a computer to learn from training data. Such artificial neural networks have revolutionized the way researchers solve many complex and real-world problems in engineering, science, economics, and finance. Deep leaning is a set of powerful algorithm to make learning by neural network more robust. Deep neural network is considered to be the one more step toward a state of artificial intelligence. However, such artificial neural networks and deep neural networks are developed using a particular programming language and hence cross language support to a plurality of researches within cross-domain research fields is a challenge.

Additionally, existing artificial neural networks cannot train a network with multiple hidden layer efficiently. Further, the existing artificial neural networks cannot model complex non-linear relationships. In addition, such existing artificial neural networks are complex to interact with and hence there is no unified user interface to interact with the existing artificial neural networks. Additionally, conventional artificial neural networks require the user to select the activation function for predicting complex non-linear relationships. The user does not have insight on how the activation function must be selected and hence, a random trial and error approach is used until the user gets the desired output.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method for predicting a non-linear relationship between a plurality of parameters in a deep neural network framework. The method may include receiving a plurality of parameter values associated with the plurality of parameters. The method may further include selecting an activation function based on a desired output. In an embodiment, the desired output may be based on an industry type and an application area of the plurality of parameters. The method may further include predicting the non-linear relationship between the plurality of parameters by modelling the deep neural network framework based on the selected activation function.

According to embodiments illustrated herein, there may be provided a system that may include an application server configured to predict a non-linear relationship between a plurality of parameters in a deep neural network framework. The application server may further comprise of one or more processors configured to receive a plurality of parameter values associated with the plurality of parameters. The one or more processors may be configured to select an activation function based on a desired output. In an embodiment, the desired output may be based on an industry type and an application area of the plurality of parameters. The one or more processors may be configured to predict the non-linear relationship between the plurality of parameters by modelling the deep neural network framework based on the selected activation function.

According to embodiments illustrated herein, a non-transitory computer-readable storage medium having stored thereon, a set of computer-executable instructions for causing a computer comprising one or more processors to perform steps of receiving a plurality of parameter values associated with a plurality of parameters. The one or more processors may be configured to selecting an activation function based on a desired output. In an embodiment, the desired output may be based on an industry type and an application area of the plurality of parameters. The one or more processors may be configured to predicting a non-linear relationship between the plurality of parameters by modelling the deep neural network framework based on the selected activation function.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 5 illustrates a block diagram of an exemplary computer system for implementing embodiments consistent with the present disclosure.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
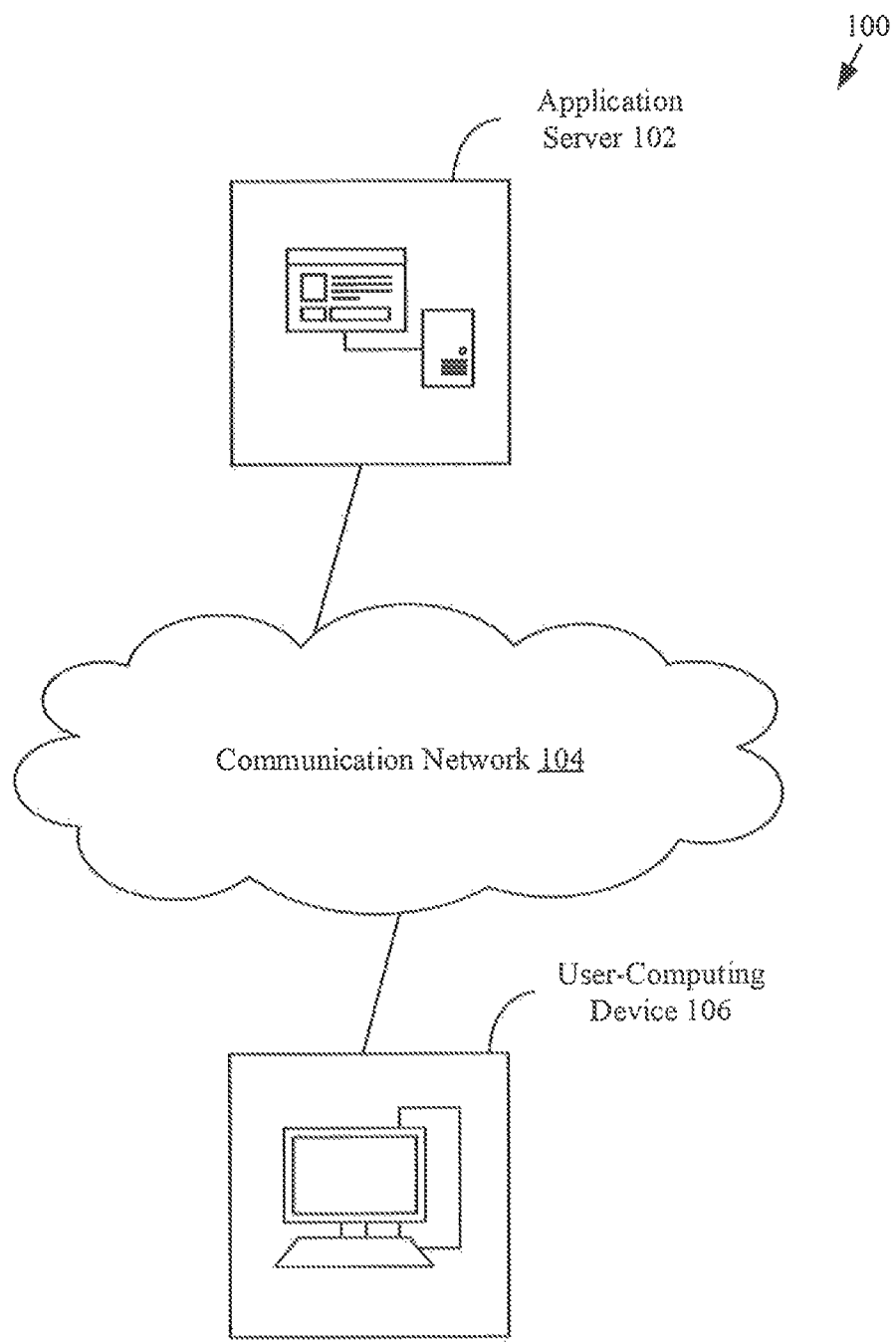
FIG. 1 is a block diagram that illustrates a system environment in which various embodiments of the method and the system may be implemented, in accordance with at least one embodiment.

FIG. 1 is a block diagram that illustrates a system environment 100 in which various embodiments of the method and the system may be implemented, in accordance with at least one embodiment. The system environment 100 may include an application server 102, a communication network 104, and a user-computing device 106. The application server 102 and the user-computing device 106 may be communicatively coupled with each other via the communication network 104, in an embodiment, the application server 102 may communicate with the user-computing device 106 using one or more protocols such as, but not limited to, Open Database Connectivity (ODBC) protocol and Java Database Connectivity (JDBC) protocol.

In an embodiment, the application server 102 may refer to a computing device or a software framework hosting an application or a software service. In an embodiment, the application server 102 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 102 may be realized through various types of application servers such as, but are not limited to, a Java application server, a .NET framework application server, a Base4 application server, a PHP framework application server, or any other application server framework.

In an embodiment, the application server 102 may be configured to receive a plurality of parameter values associated with the plurality of parameters. In an embodiment, the application server 102 may be configured to receive a training file and a testing file comprising a plurality of parameter values associated with the plurality of parameters. The application server 102 may be further configured to select an activation function based on a desired output. In an embodiment, the desired output is based on an industry type and an application area of the plurality of parameters. The application server 102 may be further configured to predict the non-linear relationship between the plurality of parameters by modelling the deep neural network framework based on the selected activation function. The operation of the application server 102 has been discussed later in conjunction with FIG. 2.

A person having ordinary skill in the art will appreciate that the scope of the disclosure is not limited to realizing the application server 102 and the user-computing device 106 as separate entities. In an embodiment, the application server 102 may be realized as an application program installed on and/or running on the user-computing device 106 without departing from the scope of the disclosure.

In an embodiment, the communication network 104 may correspond to a communication medium through which the application server 102, and the user-computing device 106 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared IR), IEEE 802.11, 802.16, 2G, 3G, 4G, 5G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the user-computing device 106 may refer to a computing device used by a user. The user-computing device 106 may comprise of one or more processors and one or more memories. The one or more memories may include computer readable code that may be executable by the one or more processors to perform predetermined operations. In an embodiment, the user-computing device 106 may present a web user interface to transmit the training file and the testing file to the application server 102. Example web user interfaces presented on the user-computing device 106 to display non-linear relationship in the form of graphs based on the received information from the user have been explained in conjunction with FIG. 4. Examples of the user-computing device 106 may include, but are not limited to, a personal computer, a laptop, a personal digital assistant (PDA), a mobile device, a tablet, or any other computing device.

Figure 2:
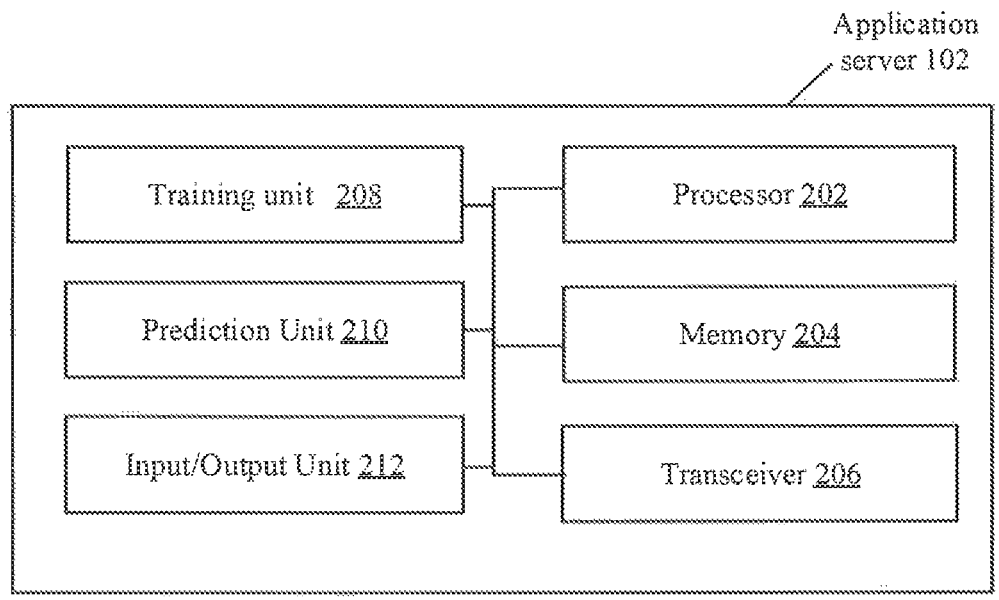
FIG. 2 is a block diagram that illustrates an application server configured to predict a non-linear relationship between a plurality of parameters in a deep neural network framework, in accordance with at least one embodiment.

FIG. 2 is a block diagram that illustrates an application server 102 configured to predicting a non-linear relationship between the plurality of parameters in the deep neural network framework, in accordance with at least one embodiment. FIG. 2 is explained in conjunction with elements from FIG. 1. In an embodiment, the application server 102 includes a processor 202, a memory 204, a transceiver 206, a training unit 208, a prediction unit 210, and an input/output unit 212. The processor 202 may be communicatively coupled to the memory 204, the transceiver 206, the training unit 208, the prediction unit 210, and the input/output unit 212. The transceiver 206 may be communicatively coupled to the communication network 104.

The processor 202 may include suitable logic, circuitry, interfaces, and/or code that may be configured to execute a set of instructions stored in the memory 204. The processor 202 may be implemented based on a number of processor technologies known in the art. The processor 202 may work in coordination with the transceiver 206, the training unit 208, the prediction unit 210, and the input/output unit 212 to predict the non-linear relationship between between the plurality of parameters in the deep neural network framework based on the selected activation function. Examples of the processor 202 include, but not limited to, an X86-based processor, a Reduced Instruction Set Computing (RISC) processor, an Application-Specific Integrated Circuit (ASIC)

processor, a Complex Instruction Set Computing (CIBC) processor, and/or other processor.

The memory 204 may include suitable logic, circuitry, interfaces, and/or code that may be configured to store the set of instructions, which are executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 may include suitable logic, circuitry, interfaces, and/or code that may be configured to receive the training file and the testing file from the user-computing device 106. The transceiver 206 may further be configured to transmit information pertaining to the generated graphs to the user-computing device 106, via the communication network 104. The transceiver 206 may implement one or more known technologies to support wired or wireless communication with the communication network 104. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The training unit 208 may include suitable logic, circuitry, interfaces, and/or code that may be configured to model the deep neural network framework based on the selected activation function. In an embodiment, the modelling may include training the deep neural network framework based on the training file. In an embodiment, the training unit 208 may be configured to train the deep neural network framework with stochastic gradient descent of the plurality of parameter values using back-propagation.

The prediction unit 210 may include suitable logic, circuitry, interfaces, and/or code that may be configured to predict the non-linear relationship between each of the plurality of parameters in the testing file by modelling the deep neural network framework based on the selected activation function.

The input/output unit 212 may include suitable logic, circuitry, interfaces, and/or code that may be configured to receive an input or transmit an output to the user-computing device 106. The input/output unit 212 may include various input and output devices that are configured to communicate with the processor 202. Examples of the Input devices include, but are not limited to, a keyboard, a mouse, a joystick, a touch screen, a microphone, a camera, and/or a docking station. Examples of the output devices include, but are not limited to, a display screen and/or a speaker.

In operation, the user-computing device 106 may be configured to display a web user interface to the user. The user may utilize the web user interface to upload the training file and the testing file comprising the plurality of parameter values associated with the plurality of parameters. The user-computing device 106 may be configured to transmit a request to the application server 102 to predict non-linear relationships between the plurality of parameters in the testing file. In an embodiment, the training file and the testing file may satisfy a pre-defined criteria. Such pre-defined criteria may include at least one of a comma separated file, unique column names in both the training file and the testing file, order of column names, or length of columns. A column describing a class associated with each of the plurality of parameters is adjacent to each parameter column in the training file and the testing file.

The application server 102 may be configured to receive the training file and the testing file that may include the plurality of parameter values associated with the plurality of parameters from the user-computing device 106. The plurality of parameters in the training file and the testing file may include a multi-variate dataset i.e. data can be numeric or categorical. For example, the plurality of parameters from the Iris dataset may be utilized as the training file (iris.csv). Below is the sample pseudo code to retrieve the plurality of parameters from the training file (iris.csv):

```
irisPath = system.file("extdata", "iris.csv", package="h2o")
iris.hex = h2o.importFile(localH2O, path = irisPath, key = "iris.hex")
summary(iris.hex)
```

For example, the plurality of parameters from the testing dataset within the testing file (test.csv) may be retrieved using the below sample pseudo code:

```
library(h2o)
library(readr)
h2o.init(nthreads=-1)
localH2O = h2o.init(ip = "localhost", port = 54321, startH2O = TRUE, Xmx = '3g')
Testlocal_full <- read_csv("path\\test.csv")
test <- as.h2o(testlocal)
cat("loading into h2o")
```

Further, the application server 102 may be configured to receive a first value corresponding to a parameter length field value from the plurality of parameter values from the user-computing device 106 via the web user interface. In an embodiment, the parameter length field value may be indicative of a column number of last parameter in the training file. For example: the parameter length field value may be 52. 52 indicates the column number of the last parameter in the training file. In an embodiment, one or more pre-defined functions including Colnames, Extremes, Quantiles, Summary, H2O Table, and the like may be utilized to extract information related to the training file and the testing file.

The Colnames function may be utilized to obtain a list of the column names including the plurality of parameters in the training file and the testing file. The Extremes function may be utilized for obtaining the maximum and minimum values in real valued columns. The Quantiles function returns a matrix displaying quantile information for all numeric columns in the data set. The Summary function may be utilized for generate an R like summary for each of the columns in the training file.

The application server 102 may be configured to select an activation function based on a desired output. In an embodiment, the desired output may correspond to a need of classification of the plurality of parameters. In an embodiment, the desired output may be based on the industry type and the application area of the plurality of parameters. Examples of such activation functions may include, but not limited to, tanh, tanwithdropout, rectifier, rectifierwithdropout, maxout, and maxoutwithdropout.

For example, the testing file includes data related to healthcare industry (industry type). The testing file may contain plurality of parameters related to a patient. In an embodiment, the application server may determine what type of data or data related to which industry is present in the testing file. Further, if the testing file is to be used by a dental surgeon for analysis for dental treatment (application area) of the patient then in one embodiment, the maxout activation function may be selected by the application server. Whereas if the same testing file is to be used by an orthopedician for performing some bone replacement surgery (application area) then in one embodiment, the maxoutwithdropout activation function may be selected by the application server 102. Thus, the selection of the activation function is completely automated based on the industry type and the application area of the plurality of parameters and the need of classification of the plurality of parameters in the testing file. For every specific usage of the testing file in a particular domain/industry, the application server 102 may automatically select the appropriate activation function. In an embodiment, the same testing file including the plurality of healthcare parameters related to the patient may be utilized for deriving some observations within the automotive industry. In such scenarios, the selection of the activation function cannot be the same as that was done previously. In such a scenario, in one embodiment, the application server may select the tanwithdropout activation function. For example, if the health data of the patient is used to predict sleeping patterns of the patient. In an embodiment, such data (sleeping patterns) may be useful within the automotive industry (industry type) to generate alerts within an automobile (application area) for preventing the user to drive the vehicle. In an alternate embodiment, a few sensors within the vehicle may take control of the vehicle and the vehicle may be self-driven during the time-period of the sleeping pattern of the patient who is using the automotive. The selection of the activation function may be performed based on the industry type/domain associated with the plurality of parameters in the testing file and the type of application or the application area of the data/plurality of parameters from the testing file. Thus, depending on the industry type and the application area of the plurality of parameters in the testing file, the application server 102 may select the appropriate activation function.

After selection of the activation function, the application server 102 may be configured to receive an input dropout ratio and a hidden dropout ratio via the web user interface. Dropout is a form of regularization that may be performed for reducing overfitting in the deep neural network framework. In an embodiment, the application server 102 may be configured to randomly drop parameters (along with theft connections) from the deep neural network framework during training. The random dropping may prevent the parameters from co-adapting too much. The term "dropout" refers to dropping out units (both hidden and visible) in a neural network.

During training, the training unit 208 may dropout samples of the plurality of parameters in an exponential number of different neural networks. The application server 102 may be configured to learn multiple independent representations of the plurality of parameters by alternatively disabling neurons within the deep neural network framework during the training. During testing (prediction of non-linear relationships), the application server 102 may approximate the effect of averaging the predictions of the neural networks.

Dropout is an efficient way of performing model averaging with the deep neural network framework. In an embodiment, the dropout improves the performance of neural networks on supervised learning tasks in vision, speech recognition, document classification and computational biology, obtaining state-of-the-art results on benchmark data sets, such as Iris dataset.

In an embodiment, the input dropout ratio may control dropout between an input layer and a first hidden layer within the deep neural network framework. The input dropout ratio may be used independently of the activation function. In an embodiment, the hidden dropout ratio may control dropout between each hidden layer and a next layer (which is either the next hidden layer, or the output layer). The hidden dropout ratio is dependent on the selected activation function. The application server 102 must select one of the activation functions before receiving the hidden dropout ratio.

In an embodiment, the deep neural network framework may comprise of
H2O Oxdata's deep learning implementation which is internally running on Hadoop ecosystem and connected to R via REST API
Perl is use to provide API support to users
Xampp functions to provide PHP implementation and web based user interface for easy data entry and visual representation of results
R language: H2O Oxdata's deep learning implemented in R language In an embodiment, the deep neural network framework may be implemented using R language. The deep neural network framework may run on Hadoop and may be connected to the R language using REST API. In order to train the deep neural network framework with dropout using H2O in R language for the plurality of parameters (ADADELTA hyper-parameters) in the iris dataset, the training unit 208 may receive the input dropout ratio and the hidden dropout ratio as below:
hyper_params<-list(
input_dropout_ratio=c(0, 0.15, 0.3),
hidden_dropout_ratios=c(0.3,0.3),
hidden=c(32,32))

Based on the received input dropout ratio and the hidden dropout ratio, the training unit 208 may be configured to train the deep neural network framework with multiple hidden layer. In an embodiment, the training unit 208 may be configured to train the deep neural network framework to predict non-linear relationships between the plurality of parameters in the testing file. The training unit 208 may be configured to perform at least one of Nesterov Accelerated gradient and Adaptive learning rate (ADADELTA) on the testing file. In an embodiment, the deep neural network framework may be trained by the training unit 208 with stochastic gradient descent using back-propagation. In an embodiment, the deep neural network framework may be further trained by the training unit 208 based on at least one of tank, rectifier and maxout activation function.

Below is a pseudo code written in R language that may be utilized for H2O local host connect and to train the deep neural network framework.

```
#COMMENT START
#================================================================#
#h2o.init-Connect to H2O and Install R Package
#system.file-for loading local files
#h2o.importFile- this library is used for creating unique hex identity for system
file
#h2o.deeplearning- this library is used for performing Deep Learning neural
networks on an H2OParsedData object.
#override_with_best_model-If enabled, override the final model with the best
model #found during training. Defaults to true.
#nfolds (Optional)- Number of folds for cross-validation. If nfolds >= 2, then
validation must remain empty.
#activation-A string indicating the activation function to use. Must be either
"Tanh", "TanhWithDropout", "Rectifier", "RectifierWithDropout", "Maxout" or
"MaxoutWithDropout". This selection of the actiation function is done by the
application server based on the desired output and is based on the industry
type and the application area of the plurality of parameters.
#hidden-Hidden layer sizes (e.g. c(100,100)
#epochs-How many times the dataset should be iterated (streamed), can be
fractional
#balance_classes-Balance training data class counts via over/under-sampling
(for imbalanced data)
#Input_dropout_ratio-Input layer dropout ratio (can improve generalization, try
0.1 or 0.2)
#hidden_dropout_ratios-Hidden layer dropout ratios (can improve
generalization), #specify one value per hidden layer, defaults to 0.5
#h2o.predict-H2O Model Predictions
#h2o.performance-Performance Measures
#h2o.saveModel - Save a H2OModel object to a disk and can be loaded back
into H2O using h2o.loadModel.
#plot-Draw scatter plot of a particular performance measure vs. thresholds for a
H2O model, or the ROC curve.
#===========================================================
===#
#COMMENT ENDS
```

After training the deep neural network framework based on the training file, the prediction unit 210 may be configured to predict the non-linear relationship between the plurality of parameters by modelling the deep neural network framework based on the selected activation function. In an embodiment, the deep neural network framework may be trained by the training unit 208 based on the training file and the the received input dropout ratio and the hidden dropout ratio. The prediction unit 210 may determine complex non-linear relationships between the plurality of parameters in the testing file based on the training of the deep neural network framework. In an embodiment, the activation function may be selected based on the training file. In an embodiment, the prediction unit 210 may be configured to generate graphs that may be indicative of the non-linear relationship between each of the plurality of parameters in the testing file.

Below is a sample pseudo code that may be utilized for predicting the non-linear relationship between each of the plurality of parameters in the testing file by modelling the deep neural network framework based on the selected activation function.

```
#Program Starts
for(i in 1:10)#10 fold
{
  library(h2o)
  library(MASS)
  localH2O = h2o.init(nthreads = -1,max_mem_size = "10g")#10gb RAM,all
```

-continued

```
CPU
    IrisPath = system.file("extdata", "train3,csv", package = "h2o") #train3.csv-
training dataset of an patient
    iris.hex = h2o.importFile(localH2O, path = irisPath)
    model<-h2o.deeplearning(x = 1:3542, y = 3543, data = iris.hex, activation =
"TanhWithDropout", # or 'Tanh'
        input_dropout_ratio = 0.2, # % of inputs dropout
        hidden_dropout_ratios = c(0.5,0.5,0.5,0.5), # % for nodes
dropout
epoch=10,balance_classes              =      TRUE,       hidden     =
c(1000,700,300, 150), nesterov_accelerated_gradient=TRUE,adaptive_rate=TR
UE)
    print(model)
    name<-paste('dmalano_',i,sep="")
    h2o.saveModel(object = model, dir = "C:/Users/czanpure/Documents/R/win-
library/3.1/h2o/extdata/",name=name, save_cv = TRUE, force = TRUE)
#model = h2o.loadModel(localH2O, "C:/Users/ czanpure /Documents/R/win-
library/3.1/h2o/extdata/cele_server") #for loading existing model
    test = system.file("extdata", "test.csv", package = "h2o") #test.csv- testing
dataset of an patient
    test.hex = h2o.importFile(localH2O, path = test)
    h2o_yhat_test <- h2o.predict(model, test.hex)
    summary(h2o_yhat_test)
    print(h2o_yhat_test)
    perf = h2o.performance(h2o_yhat_test[,3], test.hex$class, measure =
"precision")
    perf = h2o.performance(h2o_yhat_test[,3], test.hex$class, measure =
"precision")
    plot(perf, type = "cutoffs")       #Plot precision vs. thresholds
    plot(perf, type = "roc")      #Plot ROC curve
    write.matrix(h2o_yhat_test,           paste("C/Users/czanpure/Documents/R/win-
library/3.1/h2o/extdata/",name))
}
h2o.shutdown(localH2O, prompt = FALSE)h2o_yhat_test <- h2o.predict(model,
test.hex)
summary(h2o._yhat_test)
print(h2o_yhat_test)
perf = h2o.performence(h2o_yhat_test[,3], test.hex$class, measure =
"precision")
plot(perf, type = "cutoffs")       #Pot precision vs. thresholds
plot(perf, type = "roc")      #Plot ROC curve
#write.table(h2o_yhat_test,             file='xyz.txt',            row.names=FALSE,
col.names=FALSE, sep="\t")
write.matrix(h2o_yhat_test,                  'C/Users/czanpure/Documents/R/win-
library/3.1/h2o/extdata/xyz.txt',sep="\t")
```

After generating the graphs, the application server 102 may be configured to transmit information pertaining to the generated graphs to the user-computing device 106. In an embodiment, the graphs may be displayed on a display screen of the user-computing device 106. Alternatively, in an embodiment, the graphs may be displayed on a display screen of the application server 102. The web user interface displayed on the display screen on the user-computing device 108 is explained later in conjunction with FIG. 4.

Figure 3:
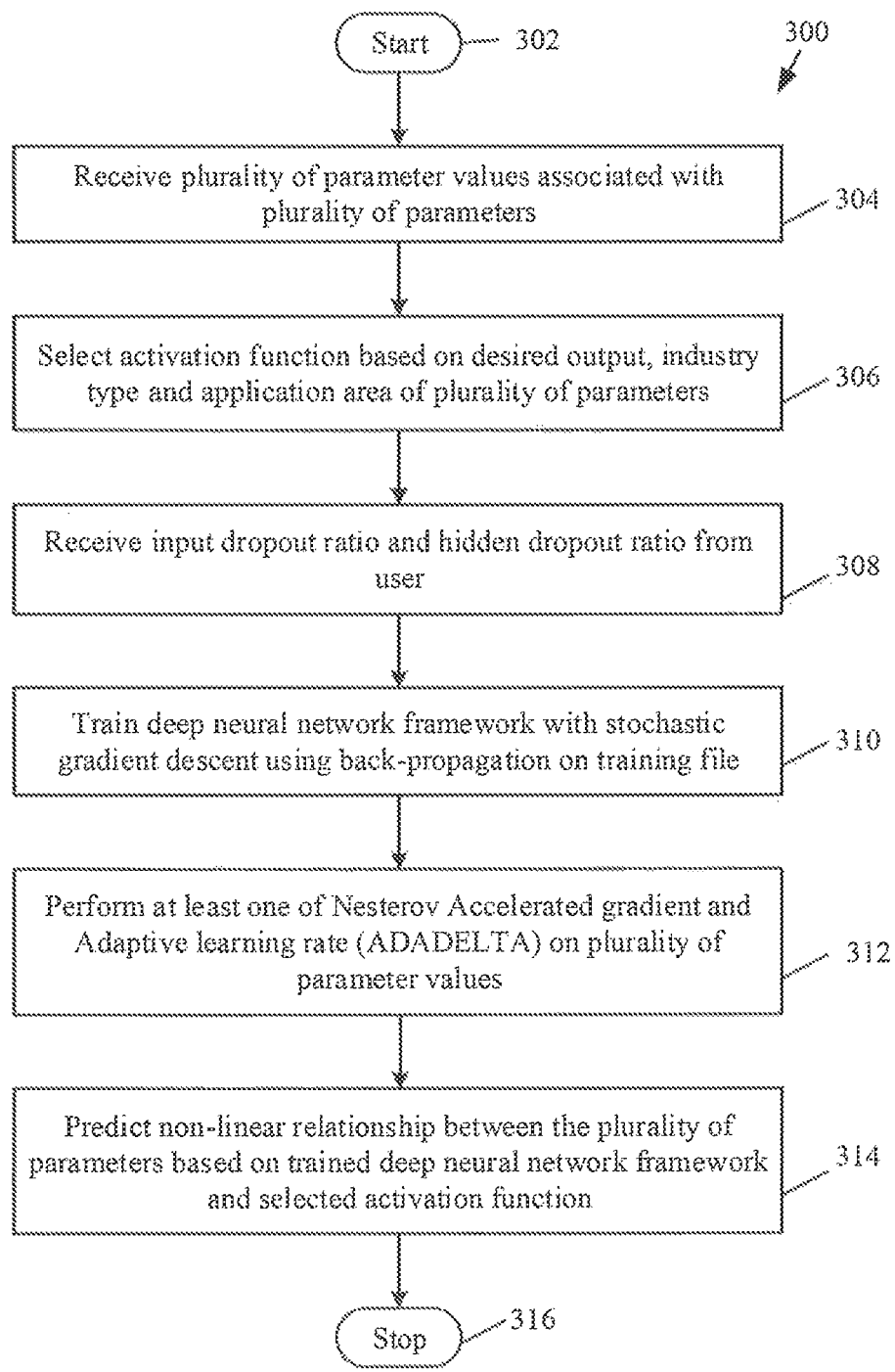
FIG. 3 is a flowchart that illustrates a method for predicting a non-linear relationship between a plurality of parameters in a deep neural network framework, in accordance with at least one embodiment.

FIG. 3 is a flowchart 300 that illustrates a method to predict the non-linear relationship between each of the plurality of parameters in the deep neural network framework, in accordance with at least one embodiment. The flowchart 300 is described in conjunction with FIG. 1 and FIG. 2.

The method starts at step 302. At step 304, the application server 102 may be configured to receive the plurality of parameter values associated with the plurality of parameters. At step 306, the application server 102 may be configured to select the activation function based on the desired output. In an embodiment, the desired output is based on the industry type and the application area of the plurality of parameters. At step 308, the application server 102 may be configured to receive the input dropout ratio and the hidden dropout ratio.

At step 310, the application server 102 may be configured to train the deep neural network framework with stochastic gradient descent using back-propagation on the training file. At step 312, the application server 102 may be configured to perform at least one of Nesterov Accelerated gradient and Adaptive learning rate (ADADELTA) on the plurality of parameter values. At step 314, the application server 102 may be configured to predict the non-linear relationship between the plurality of parameters based on the trained deep neural network framework and the selected activation function. Control passes to end step 316.

Figure 4:
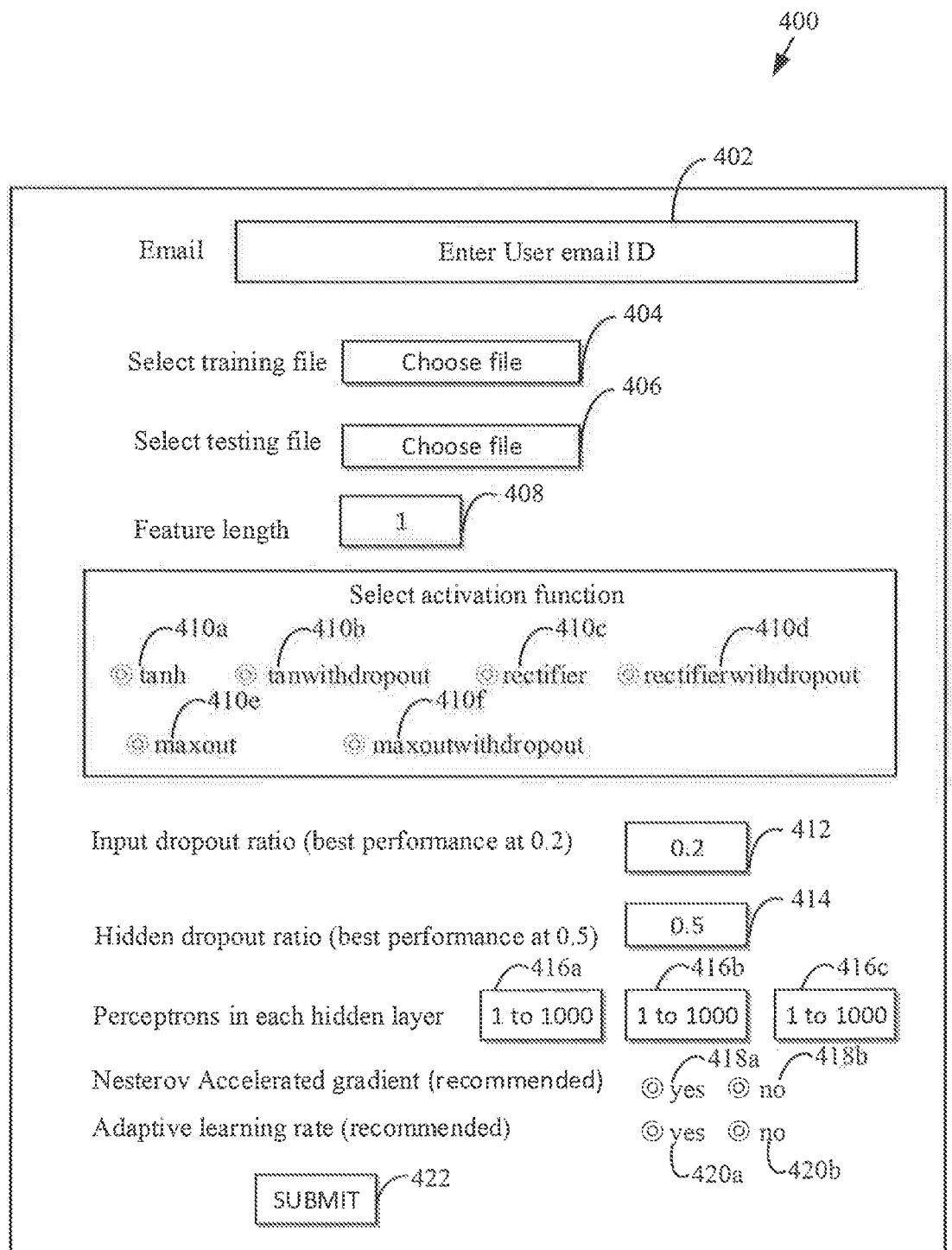
FIG. 4 illustrates an example web user-interface presented on a user-computing device, in accordance with at least one embodiment.

FIG. 4 illustrates an example web user-interface 400 presented on the user-computing device 106, in accordance with at least one embodiment.

The web user-interface 400 is designed such that it is very easy to understand and use for a naïve user. In an embodiment, the email id of the user is received via the input box 402 as a unique identity for the request to be submitted by the user. The user may upload the training file by using the command button 404. The user may upload the testing file by using the command button 406. The testing file and the training file submitted to application server 102 must meet following pre-defined criteria:
1) It should be in comma-separated file (csv)
2) It should not contain Row names
3) Column names in testing and training file must be unique, must be in same order and must be of same length
4) Column describing class of the plurality of parameters must be very next to the last column of the parameter. For example, if column 1 to column 4 contain parameter of the healthcare data then column 5 must contain class corresponding to the parameter.

Further, using the input box 408 the user may provide the first value corresponding to a parameter length field value. In an embodiment, for the parameter length field value, the user must enter the column number of last parameter in the training file e.g. $4^{th}$ in above given example. Further, in an embodiment, the application server 102 may select the activation function denoted by 410a, 410b, 410c, 410d, 410e, and 410f. In an alternate embodiment, the user may select the activation function manually. Further, the application server 102 may receive the input dropout ratio from the user that is displayed in the input box 412. Similarly, the application server 102 may receive the hidden dropout ratio and display the same in the input box 414. In an embodiment, the input dropout and hidden dropout may be pre-populated by the application server 102 as 0.2 and 0.5 respectively, however the user can change these values. The default value of input dropout ratio and hidden dropout ratio have been pre-populated to provide the desired output and allow naïve user to get started quickly.

Online interface presently supports three hidden layers, where number of perceptions in any hidden layer can span between 1 to 1000. The perceptron in each hidden layer of the deep neural network framework may be displayed in the control boxes 416a, 416b, 416c. Additionally, the user may select at least one of Nesterov Accelerated gradient and Adaptive learning rate (ADADELTA) to be performed on the training file. Such a selection may be performed with the help of radio buttons 418a, 418b, 420a, and 420b. Nesterov Accelerated gradient and Adaptive learning rate (ADADELTA) may be applied to avoid problem of overfitting and make training faster. Lastly, the user may perform an input operation such as a click event on the control button 422 to initiate the process of predicting a non-linear relationship between each of the plurality of parameters in the deep neural network framework.

A person skilled in the art will understand that the user-interface 400 is described herein for illustrative purposes and should not be construed to limit the scope of the disclosure.

Presently considering limited server resources, to each job the application server 102 may assign 2 GB of RAM and 2 threads of CPU. Once the request is submitted to the application server 102, the deep neural network framework starts the process of training and prediction. However, taking in consideration issue of limitation of computational resources on the server machine, in an alternate implementation, the deep neural network framework may be implemented in a standalone manner on the application server 102.

Ease in use with standalone deep neural network framework comes due to Perl based API and web based visual representation of result in form of plots. API is so designed so that it is understandable by any average computer user, and require no advance knowledge of machine learning algorithms, in the API, some default parameter can be customized and any experienced user can improve, speed and accuracy of the learning. Standalone version of the deep neural network framework capable of forming neural network with 3 to 7 hidden layer with n number of perceptron in any layer. API is designed such that system resource like amount of RAM and number of CPU cores to be used can be specified. API also has a provision to save a trained model of the data, which will enable the user to apply a previously stored model to test data without trading data repeatedly.

Computer System

FIG. 5 illustrates a block diagram of an exemplary computer system for implementing embodiments consistent with the present disclosure. Variations of computer system 501 may be used for performing optical character recognition on an image including a plurality of printed characters. The computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, mall computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, ISM OS/2, Microsoft Windows (e.g., Aero, Metro, etc.), Unix X-Windows, web interface libraries (e.g., ActiveX, Java, Javascript, AJAX, HTML, Adobe Rash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft NET, CGI scripts, Java, JavaScript, PERL, PHP, Python, WebObjects, etc. The mail server may utilize communication protocols such as internet message access protocol (MAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to predict a non-linear relationship between a plurality of parameters in a deep neural network framework. The at least one code section in an application server 102 causes the machine and/or computer comprising one or more processors to perform the steps, which comprises receiving, by an application server, a plurality of parameter values associated with the plurality of parameters. The one or more processors may be configured to selecting, by the application server, an activation function based on a desired output, wherein the desired output is based on an industry type and an application area of the plurality of parameters. The one or more processors may be configured to predicting, by the application server, the non-linear relationship between the plurality of parameters by modelling the deep neural network framework based on the selected activation function.

The present disclosure may be realized in hardware, or a combination of hardware and software. The present disclosure may be realized hi a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

Advantages

Cross language support is provided to a plurality of researches within cross-domain research fields. Automatic selection of the activation function for predicting complex non-linear relationships. Efficiently train the deep learning network with multiple hidden layers using the automatically selected activation function. Unified user interface to interact with the existing artificial neural networks enables easy user interaction for nave users.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for predicting a non-linear relationship between a plurality of parameters in a deep neural network framework, the method comprising:
    receiving, by an application server, a testing file comprising a plurality of parameter values associated with the plurality of parameters;
    receiving, by the application server, an input dropout ratio;
    automatically selecting, by the application server, an activation function based on a desired output, wherein the desired output is based on an industry type and an application area of the plurality of parameters;
    receiving, by the application server and after the application server selects the activation function, a hidden dropout ratio based on the selected activation function;
    predicting, by the application server, the non-linear relationship between the plurality of parameters by modelling the deep neural network framework based on the selected activation function, wherein modelling the deep neural network framework comprises training the deep neural network framework based on a training file, wherein the training comprises:
        randomly dropping one or more parameters from the deep neural network framework during training, wherein dropping is performed for reducing overfitting in the deep neural network framework;
        alternatively disabling neurons within the deep neural network framework during training of the deep neural network framework to learn multiple independent representations of the plurality of parameters,
        wherein the deep neural network framework is trained based on the input dropout ratio and the hidden dropout ratio with stochastic gradient descent using back-propagation,
        wherein the input dropout ratio controls dropout between an input layer and a first hidden layer within the deep neural network framework and the input dropout ratio is used independently of the activation function, and
        wherein the hidden dropout ratio controls dropout between each hidden layer and a next layer, wherein the next layer is one of: a next hidden layer or an output layer;
    wherein the selection of the activation function is different for each industry type and application area, wherein the industry type is healthcare industry and wherein if the testing file is by a dental surgeon and if the application area is analysis for dental treatment then maxout activation function is automatically selected, and wherein if the testing file is used by an orthopedician for performing a bone replacement surgery which is another application area then maxoutwithdropout activation function is automatically selected, and wherein the testing file including a plurality of healthcare parameters related to a patient is utilized for deriving one or more observations within an automotive industry, wherein tanwithdropout activation function is automatically selected to predict sleeping patterns of a user and to generate alerts within an automobile for preventing the user to drive the automobile; and
    generating, by the application server, one or more graphs indicative of the non-linear relationship between each of the plurality of parameters.

2. The method of claim 1, further comprising receiving a parameter length field value from the plurality of parameter values, wherein the parameter length field value is indicative of a column number of last parameter, and wherein a column describing a class associated with the plurality of parameters is adjacent to the last parameter.

3. The method of claim 1, wherein the activation function is tanh, tanwithdropout, rectifier, rectifierwithdropout, maxout, or maxoutwithdropout.

4. The method of claim 1, further comprising performing at least one of Nesterov Accelerated gradient and Adaptive learning rate (ADADELTA) on the plurality of parameter values.

5. The method of claim 1, further comprising selecting the activation function based on the training file.

6. The method of claim 1, further comprising a web user interface, wherein the web user interface is utilized by a user to provide the training file and the testing file comprising the plurality of parameter values associated with the plurality of parameters.

7. The method of claim 1, wherein the deep neural network framework is further trained based on at least one of tanh, rectifier or maxout activation function.

8. An application server to predict a non-linear relationship between a plurality of parameters in a deep neural network framework, the application server comprising:
    a processor; and
    a memory communicatively coupled to the processor, wherein the memory stores processor instructions, which, on execution, causes the processor to:

receive a testing file comprising a plurality of parameter values associated with the plurality of parameters;

receive an input dropout ratio;

automatically select an activation function based on a desired output, wherein the desired output is based on an industry type and an application area of the plurality of parameters;

receive, after selecting the activation function, a hidden dropout ratio based on the selected activation function;

predict the non-linear relationship between the plurality of parameters by modelling the deep neural network framework based on the selected activation function, wherein modelling the deep neural network framework comprises training the deep neural network framework based on a training file, wherein the training comprises:

randomly dropping of one or more parameters from the deep neural network framework during training, wherein dropping is performed for reducing overfitting in the deep neural network framework;

alternatively disabling neurons within the deep neural network framework during training of the deep neural network framework to learn multiple independent representations of the plurality of parameters, wherein the deep neural network framework is trained based on the input dropout ratio and the hidden dropout ratio with stochastic gradient descent using back-propagation, wherein the input dropout ratio controls dropout between an input layer and a first hidden layer within the deep neural network framework and the input dropout ratio is used independently of the activation function, and wherein the hidden dropout ratio controls dropout between each hidden layer and a next layer, wherein the next layer is one of: a next hidden layer or an output layer;

wherein the selection of the activation function is different for each industry type and application area, wherein the industry type is healthcare industry and wherein if the testing file is by a dental surgeon and if the application area is analysis for dental treatment then maxout activation function is automatically selected, and wherein if the testing file is used by an orthopedician for performing a bone replacement surgery which is another application area then maxoutwithdropout activation function is automatically selected, and wherein the testing file including a plurality of healthcare parameters related to a patient is utilized for deriving one or more observations within an automotive industry, wherein tanwithdropout activation function is automatically selected to predict sleeping patterns of a user and to generate alerts within an automobile for preventing the user to drive the automobile; and generate one or more graphs indicative of the non-linear relationship between each of the plurality of parameters.

9. The application server of claim 8, wherein the one or more processors are configured to receive a parameter length field value from the plurality of parameter values, wherein the parameter length field value is indicative of a column number of last parameter, and wherein a column describing a class associated with the plurality of parameters is adjacent to the last parameter.

10. The application server of claim 8, wherein the activation function is tanh, tanwithdropout, rectifier, rectifierwithdropout, maxout, or maxoutwithdropout.

11. The application server of claim 8, wherein the one or more processors are configured to perform at least one of Nesterov Accelerated gradient and Adaptive learning rate (ADADELTA) on the plurality of parameter values.

12. The application server of claim 8, wherein the one or more processors are configured to select the activation function based on the training file.

13. The application server of claim 8, wherein the deep neural network framework is further trained based on at least one of tanh, rectifier or maxout activation function.

14. A non-transitory computer-readable storage medium having stored thereon, a set of computer-executable instructions for causing a computer comprising one or more processors to perform steps comprising:

receiving a testing file comprising a plurality of parameter values associated with a plurality of parameters;

receiving an input dropout ratio;

automatically selecting an activation function based on a desired output, wherein the desired output is based on an industry type and an application area of the plurality of parameters;

receiving, after selecting the activation function, a hidden dropout ratio based on the selected activation function;

predicting a non-linear relationship between the plurality of parameters by modelling the deep neural network framework based on the selected activation function, wherein modelling the deep neural network framework comprises training the deep neural network framework based on a training file, wherein the training comprises:

randomly dropping of one or more parameters from the deep neural network framework during training, wherein dropping is performed for reducing overfitting in the deep neural network framework;

alternatively disabling neurons within the deep neural network framework during training of the deep neural network framework to learn multiple independent representations of the plurality of parameters, wherein the deep neural network framework is trained based on the input dropout ratio and the hidden dropout ratio with stochastic gradient descent using back-propagation, wherein the input dropout ratio controls dropout between an input layer and a first hidden layer within the deep neural network framework and the input dropout ratio is used independently of the activation function, and wherein the hidden dropout ratio controls dropout between each hidden layer and a next layer, wherein the next layer is one of: a next hidden layer or an output layer;

wherein the selection of the activation function is different for each industry type and application area, wherein the industry type is healthcare industry and wherein if the testing file is by a dental surgeon and if the application area is analysis for dental treatment then maxout activation function is automatically selected, and wherein if the testing file is used by an orthopedician for performing a bone replacement surgery which is another application area then maxoutwithdropout activation function is automatically selected, and wherein the testing file including a plurality of healthcare parameters related to a patient is utilized for deriving one or more observations within an automotive industry, wherein tanwithdropout activation function is automatically selected to predict sleeping patterns of a user and to generate alerts within an automobile for preventing the user to drive the automobile; and generating one or more graphs indicative of the non-linear relationship between each of the plurality of parameters.

15. The method of claim 1, wherein one or more predefined functions comprising Colnames, Extremes, Quantiles, Summary, H2O Table, are utilized to extract information related to the training file and the testing file, and wherein the Colnames function is utilized to obtain a list of the column names including the plurality of parameters in the training file and the testing file, wherein the Extremes function is utilized for obtaining the maximum and minimum values in real valued columns, wherein the Quantiles function returns a matrix displaying quantile information for all numeric columns in the training file and the testing file, wherein the Summary function is utilized to generate an R like summary for each of the columns in the training file.

* * * * *